(12) United States Patent
Yamamoto et al.

(10) Patent No.: US 11,975,662 B2
(45) Date of Patent: May 7, 2024

(54) WIRE HARNESS AND WIRE HARNESS ROUTING APPARATUS

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Satoshi Yamamoto, Mie (JP); Makoto Higashikozono, Mie (JP); Hidetoshi Ishida, Mie (JP); Yasuyuki Otsuka, Mie (JP); Toyoki Furukawa, Mie (JP); Hayato Ooi, Mie (JP); Hirotaka Kato, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 262 days.

(21) Appl. No.: 17/434,897

(22) PCT Filed: Dec. 12, 2019

(86) PCT No.: PCT/JP2019/048686
§ 371 (c)(1),
(2) Date: Aug. 30, 2021

(87) PCT Pub. No.: WO2020/179176
PCT Pub. Date: Sep. 10, 2020

(65) Prior Publication Data
US 2022/0134975 A1    May 5, 2022

(30) Foreign Application Priority Data
Mar. 5, 2019 (JP) ................. 2019-039525

(51) Int. Cl.
*B60R 16/02* (2006.01)
*H01B 7/08* (2006.01)
*H02G 3/04* (2006.01)

(52) U.S. Cl.
CPC ....... *B60R 16/0215* (2013.01); *H01B 7/0823* (2013.01); *H02G 3/0406* (2013.01)

(58) Field of Classification Search
CPC ............ H01B 7/0837; H01B 13/01254; H01B 7/0045; H01B 7/08; H01B 7/0823;
(Continued)

(56) References Cited

U.S. PATENT DOCUMENTS 3,763,306 A * 10/1973 Marshall ................ H01B 11/00
174/120 SR
5,342,997 A *  8/1994 Kanno ................. H01B 7/0838
174/117 FF (Continued)

FOREIGN PATENT DOCUMENTS

JP   2001-136632 A   5/2001
WO  2010/103904 A1   9/2010

OTHER PUBLICATIONS

International Search Report dated Mar. 10, 2020 for WO 2020/179176 A1 (4 pages).

*Primary Examiner* — Paresh Paghadal
(74) *Attorney, Agent, or Firm* — Venjuris, P.C.

(57) ABSTRACT

The wire harness 11 disclosed by the present specification includes: a sheet-shaped base member 12; and a plurality of covered electric wires W fixed side by side along the base member 12, in which the transverse cross-sectional area of at least one of the plurality of covered electric wires W is different from the transverse cross-sectional area of another covered electric wire W, and the thickness of the covered (Continued)

electric wire W is substantially the same as the thickness of the covered electric wire W adjacent thereto.

7 Claims, 10 Drawing Sheets

(58) Field of Classification Search
CPC .............. H01B 7/0838; B60R 16/0207; B60R 16/2015; B60R 16/0215; H02G 3/04; H02G 3/0406

See application file for complete search history.

(56) References Cited

U.S. PATENT DOCUMENTS

| | | | |
|---|---|---|---|
| 2001/0011603 A1* | 8/2001 | Ueno .................... | H01B 7/0823 |
| | | | 174/117 FF |
| 2019/0259511 A1* | 8/2019 | Ooi .......................... | H01B 7/04 |
| 2020/0098489 A1* | 3/2020 | Kogure ................ | H01B 7/0892 |
| 2021/0225561 A1* | 7/2021 | Rey ........................ | H01B 12/02 |

* cited by examiner

WIRE HARNESS AND WIRE HARNESS ROUTING APPARATUS

CROSS REFERENCE TO RELATED APPLICATIONS

This application is a national phase of PCT application No. PCT/JP2019/048686, filed on 12 Dec. 2019, which claims priority from Japanese patent application No. 2019-039525, filed on 5 Mar. 2019, all of which are incorporated herein by reference.

TECHNICAL FIELD

The technique disclosed in the present specification relates to a wire harness and a wire harness routing apparatus.

BACKGROUND

For example, a wire harness described in Japanese Patent Laid-open Publication No. 2001-136632 (hereinafter referred to as Patent Document 1) is known as an example of a wire harness for connecting devices mounted in a vehicle. This wire harness is constituted by bundling a plurality of electric wires having a circular cross-sectional shape into a mountain shape using a holding sheet.

PRIOR ART DOCUMENT

Patent Document

Patent Document 1: JP 2001-136632 A

SUMMARY OF THE INVENTION

Problems to be Solved

Incidentally, when such a wire harness is to be routed in a roof, a floor, or the like of a vehicle, if the routing space is limited, there is a risk that the wire harness cannot be routed. For this reason, if the routing space is limited, it is conceivable to perform routing with the wire harness formed in a flat state by arranging the plurality of electric wires flat side by side.

Figure 9:
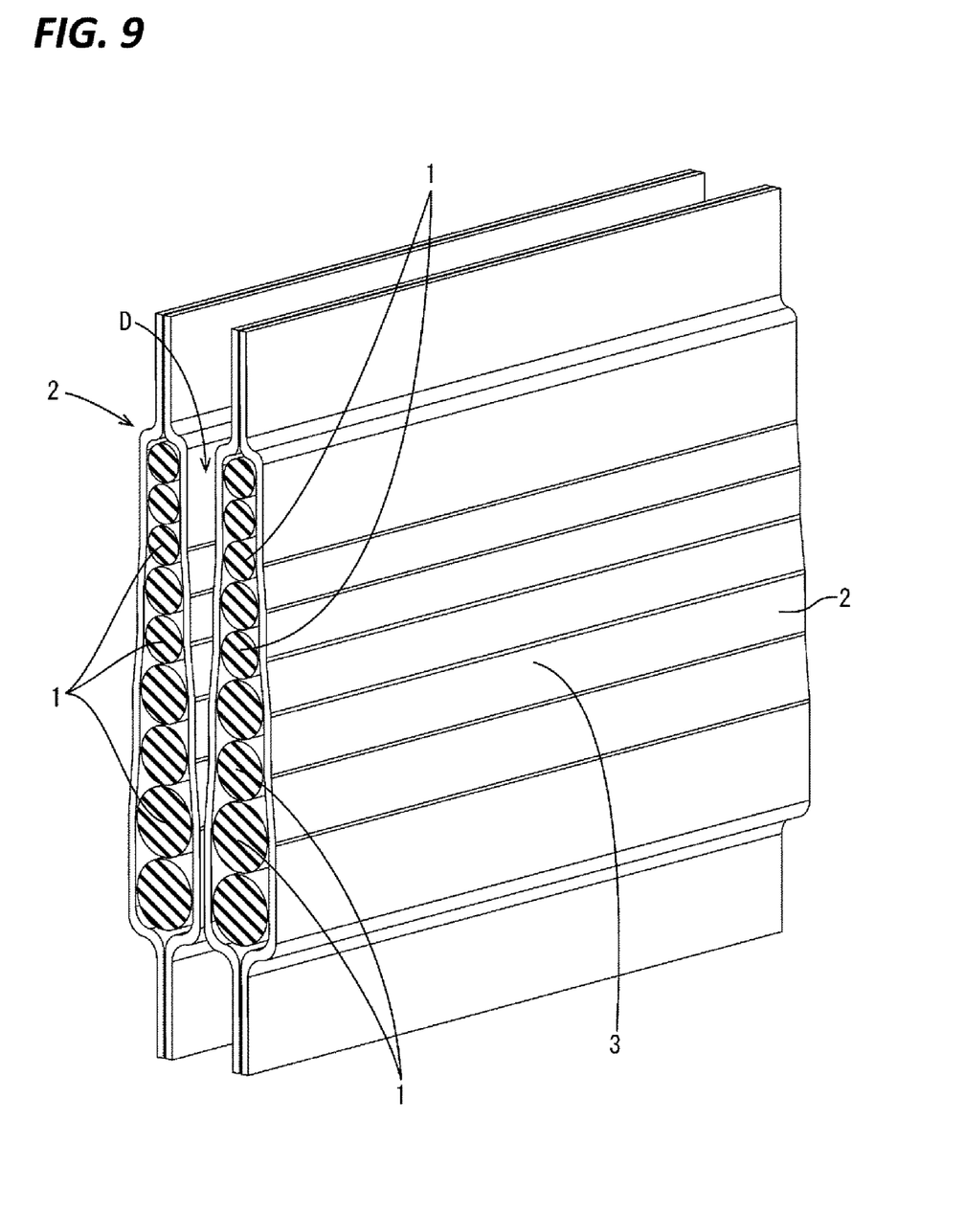
FIG. 9 is a perspective view showing a state in which two conventional wire harnesses are arranged side by side.
Figure 10:
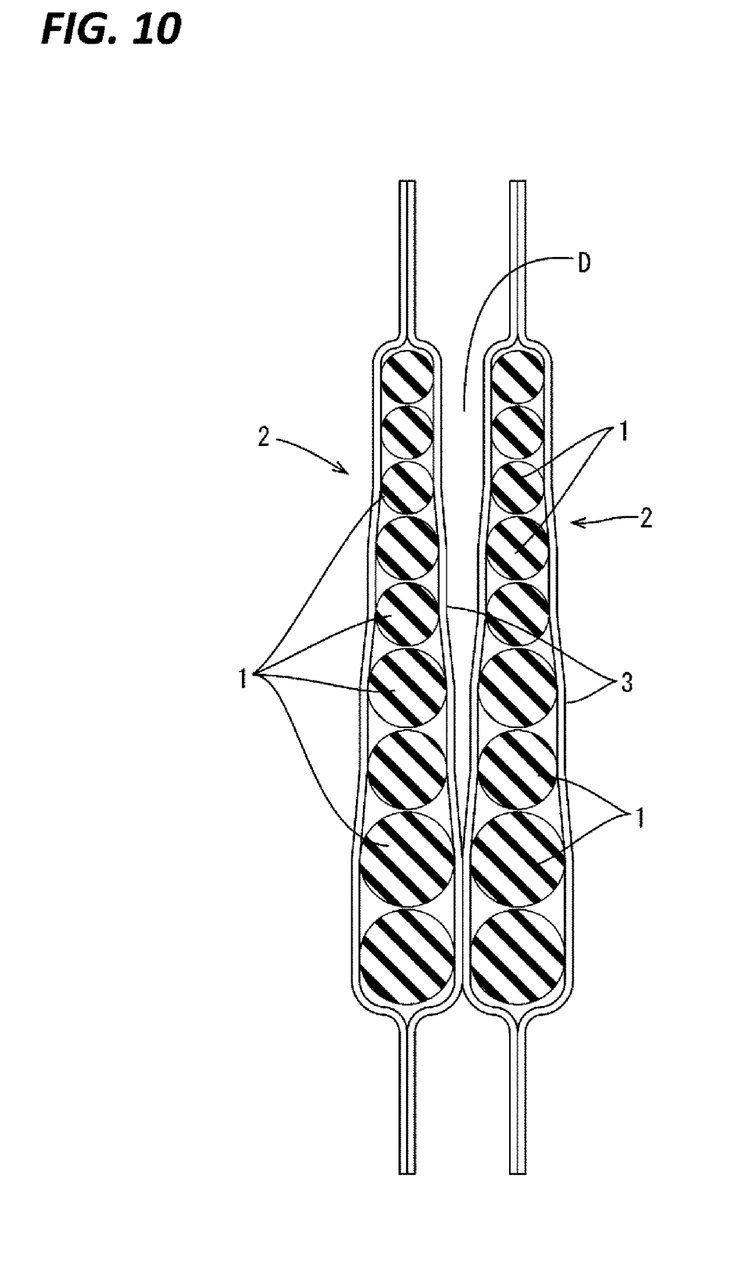
FIG. 10 is a cross-sectional view showing a state in which two conventional wire harnesses are arranged side by side.

However, as shown in FIGS. 9 and 10, if the electric wire diameters of the plurality of electric wires 1 vary, protrusions and recesses will appear on the surface 3 of the wire harness 2, and dead space D will be generated in the thickness direction of the wire harness 2 due to the variation in the thickness of the wire harness 2.

This specification discloses a technique for saving space in a wire harness.

Means to Solve the Problem

The technique disclosed herein has a configuration including: a sheet-shaped base member; and a plurality of electric wires fixed side by side along the base member, in which a transverse cross-sectional area, which is a cross-sectional area in a direction intersecting an axial direction of at least one of the plurality of electric wires, is different from a transverse cross-sectional area of another of the electric wires, and a thickness of the electric wire in a thickness direction of the base member is substantially the same as a thickness of the electric wire adjacent thereto. Here, "substantially the same" includes a case where the thicknesses of adjacent electric wires are the same and a case where the thicknesses of the adjacent electric wires can be regarded as being substantially the same even if they are different.

According to the wire harness having such a configuration, since the thicknesses of the plurality of electric wires are all substantially the same, it is possible to prevent variation in the thickness of the wire harness. As a result, it is possible to prevent dead space from being generated in the thickness direction of the wire harness and to save space in the wire harness.

The wire harness disclosed herein may also have the following configurations.

It is also possible to use a configuration in which the width in the arrangement direction of the non-minimum-diameter electric wire having a greater transverse cross-sectional area than the minimum-diameter electric wire having the smallest transverse cross-sectional area among the plurality of electric wires is greater than the thickness of the minimum-diameter electric wire.

For example, if the thickness of a covered electric wire is substantially the same as the thickness of an adjacent covered electric wire and the width of the non-minimum-diameter electric wire is smaller than the thickness of the minimum-diameter electric wire, there will be no variation in the thickness direction of the wire harness, but the thickness of the wire harness will be greater than that in the width direction. Accordingly, there is concern that the wire harness cannot be routed in a limited region.

However, with such a configuration, since the width of the non-minimum-diameter electric wire is greater than the thickness of the minimum-diameter electric wire, it is possible to prevent the thickness of the wire harness from becoming larger than that in the width direction.

It is also possible to use a configuration in which the thickness and the width of the minimum-diameter electric wire are substantially the same as each other, and the thickness of the non-minimum-diameter electric wire is set to be substantially the same as the thickness of the minimum-diameter electric wire. Here, "substantially the same" includes a case where the thickness and the width are the same and a case where the thickness and the width can be regarded as being substantially the same even if they are different.

According to such a configuration, since the thickness and the width of the minimum-diameter electric wire are substantially the same, for example, compared to the case where the width of the minimum-diameter electric wire is greater than the thickness, it is possible to suppress a case in which the height of the wire harness increases, while suppressing a case in which the width of the harness unnecessarily increases.

It is also possible to use a configuration in which a transverse cross section of at least the non-minimum-diameter electric wire among the plurality of electric wires is rectangular.

According to such a configuration, for example, compared to the case where the transverse cross section of the non-minimum-diameter electric wire is formed in an elliptical shape, dead space between adjacent covered electric wires can be eliminated, and the installation area of the non-minimum-diameter electric wire with respect to the base member can be increased. As a result, it is possible to improve the adhesive strength of the non-minimum-diameter electric wire to the base member while saving space in the wire harness.

It is also possible to use a configuration in which a transverse cross-section of the minimum-diameter electric wire is circular.

According to such a configuration, an existing electric wire can be applied as the minimum-diameter electric wire. As a result, it is not necessary to newly manufacture the minimum-diameter electric wire, and the manufacturing cost can be reduced.

The wire harness routing apparatus disclosed by the present specification is constituted by including the wire harness, and a harness accommodation portion in which an inner harness arranged on the inner side and an outer harness arranged on the outer side are accommodated in close proximity to each other by arranging the wire harness in a wrapped state.

According to the wire harness routing apparatus having such a configuration, for example, compared to a harness routing apparatus including a wire harness in which a plurality of electric wires having electric wire diameters that vary are arranged flat side by side, the space in the thickness direction of the wire harness can be reduced when the inner harness and the outer harness are arranged in close proximity to each other. As a result, it is possible to suppress a case in which the wire harness routing apparatus increases in size.

Effect of the Invention

According to the technique disclosed in the present specification, it is possible to save space in a wire harness.

DETAILED DESCRIPTION TO EXECUTE THE INVENTION

First Embodiment

An embodiment of the technique disclosed in the present specification will be described with reference to FIGS. 1 to 7.

Figure 1:
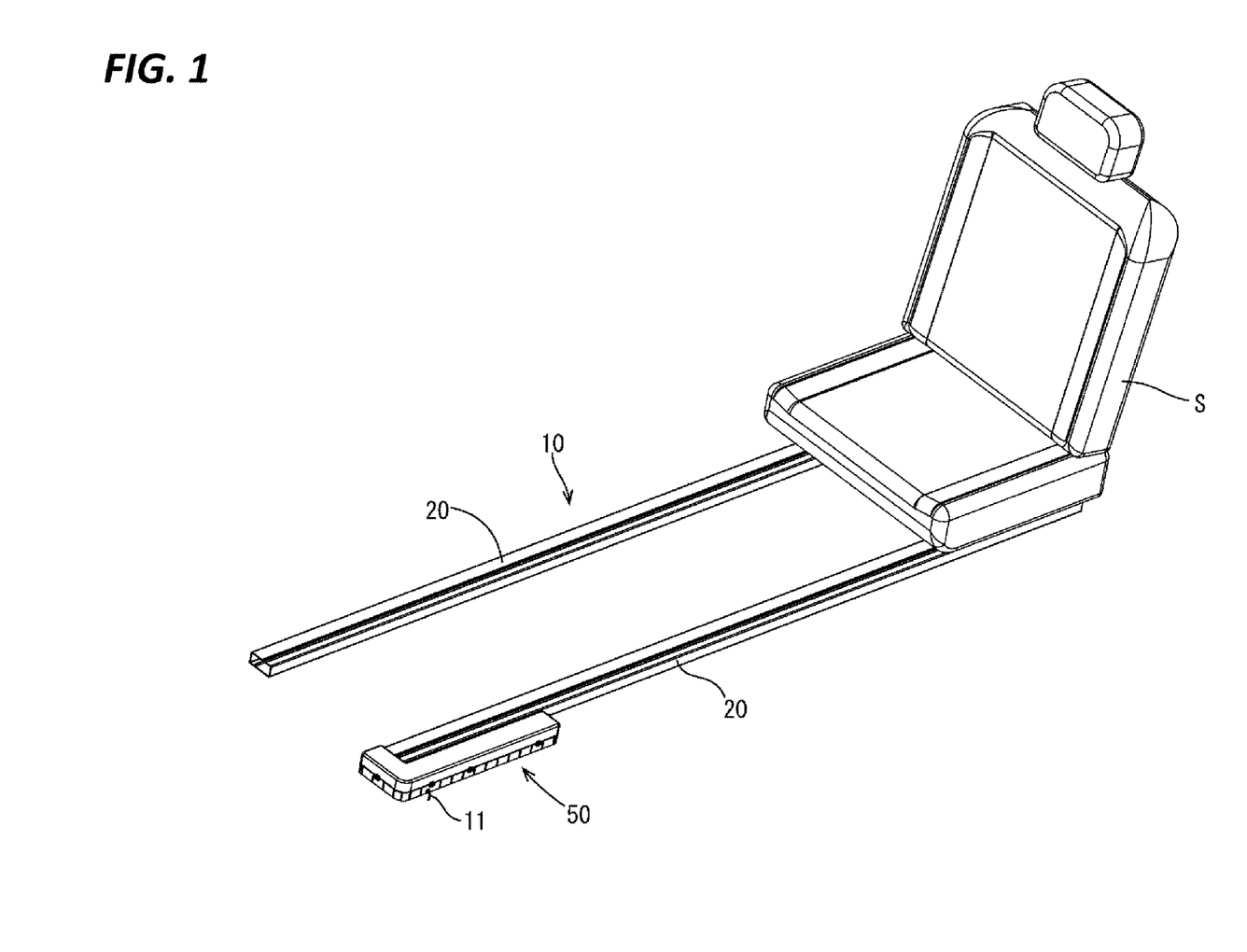
FIG. 1 is a perspective view showing a state in which a wire harness routing apparatus according to a first embodiment is attached to a seat.
Figure 2:
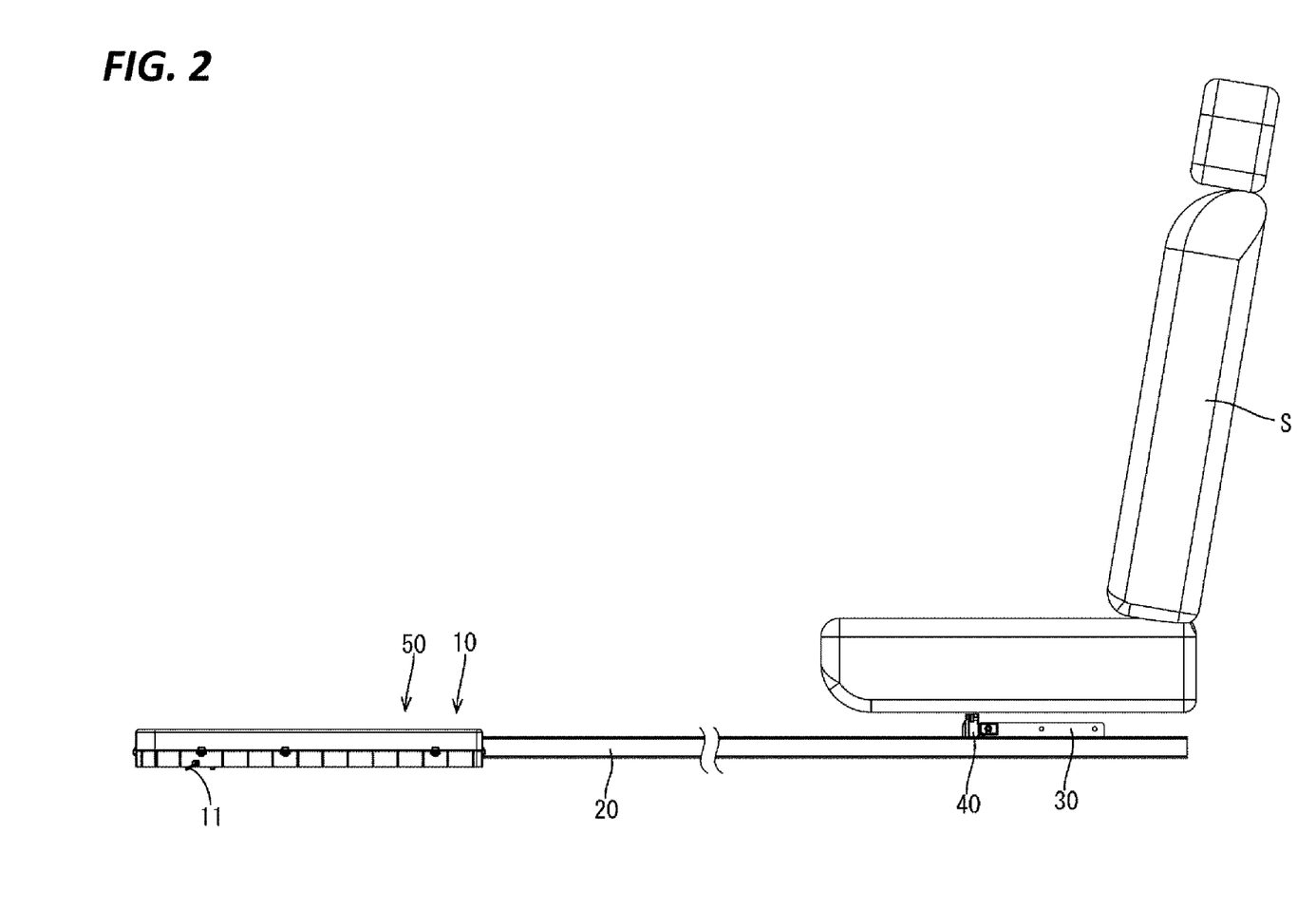
FIG. 2 is a side view showing a state in which the wire harness routing apparatus is attached to a seat.

As shown in FIG. 1 or 2, the present embodiment illustrates a wire harness routing apparatus 10 for routing a wire harness 11 between a floor portion (not shown) and a seat S of a vehicle.

The seat S is slidable in the front-rear direction on a pair of rails 20 fixed by bolting or the like to the floor of a passenger compartment or the like of the vehicle.

The seat S is provided with various electrical components such as an electric reclining device, a seat heater, a sensor for detecting whether or not an occupant is sitting, and a socket for supplying power.

As shown in FIGS. 2 to 5, the wire harness routing apparatus 10 includes rails 20, a slider 30 that is arranged so as to be able to slide in the rails 20, a wire harness 11, and a harness accommodating portion 50 that accommodates a portion of the wire harness 11.

The rails 20 are made of metal, and a pair thereof is provided on the floor with respect to the seat S. As shown in FIG. 1, the pair of rails 20 are arranged side by side in parallel, with an interval therebetween in the left-right direction. Each rail 20 has a form extending linearly in the front-rear direction, and opens in a substantially rectangular shape in the front-rear direction. Any metal such as stainless steel, aluminum, and an aluminum alloy can be appropriately selected as the metal constituting the rail 20 as needed.

Figure 5:
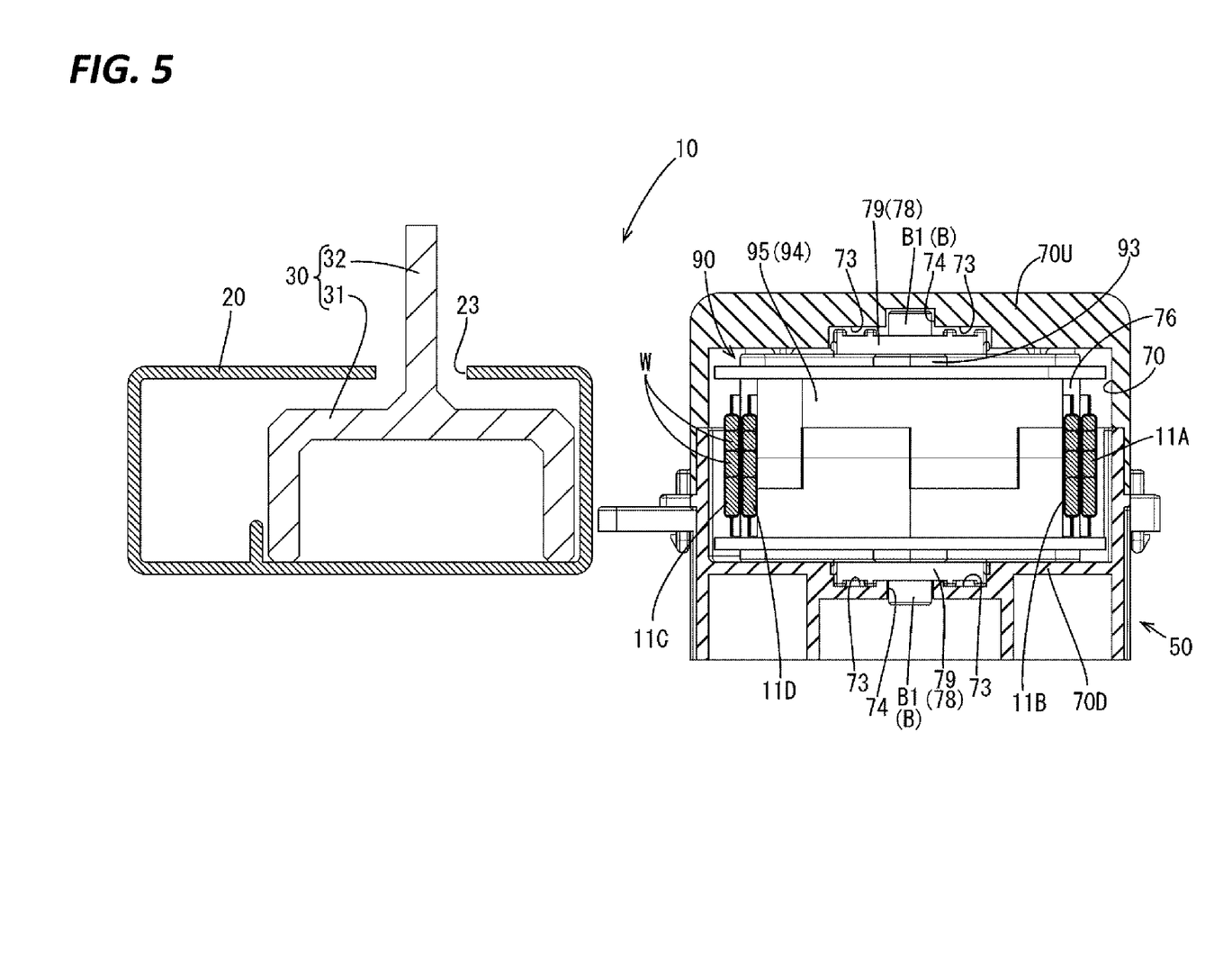
FIG. 5 is a cross-sectional view taken along line B-B in FIG. 2.

As shown in FIG. 5, a slider 30 can be inserted in each rail 20 in the front-rear direction, and a through groove 23 penetrating in the vertical direction is formed extending in the front-rear direction on the upper plate of each rail 20.

Figure 3:
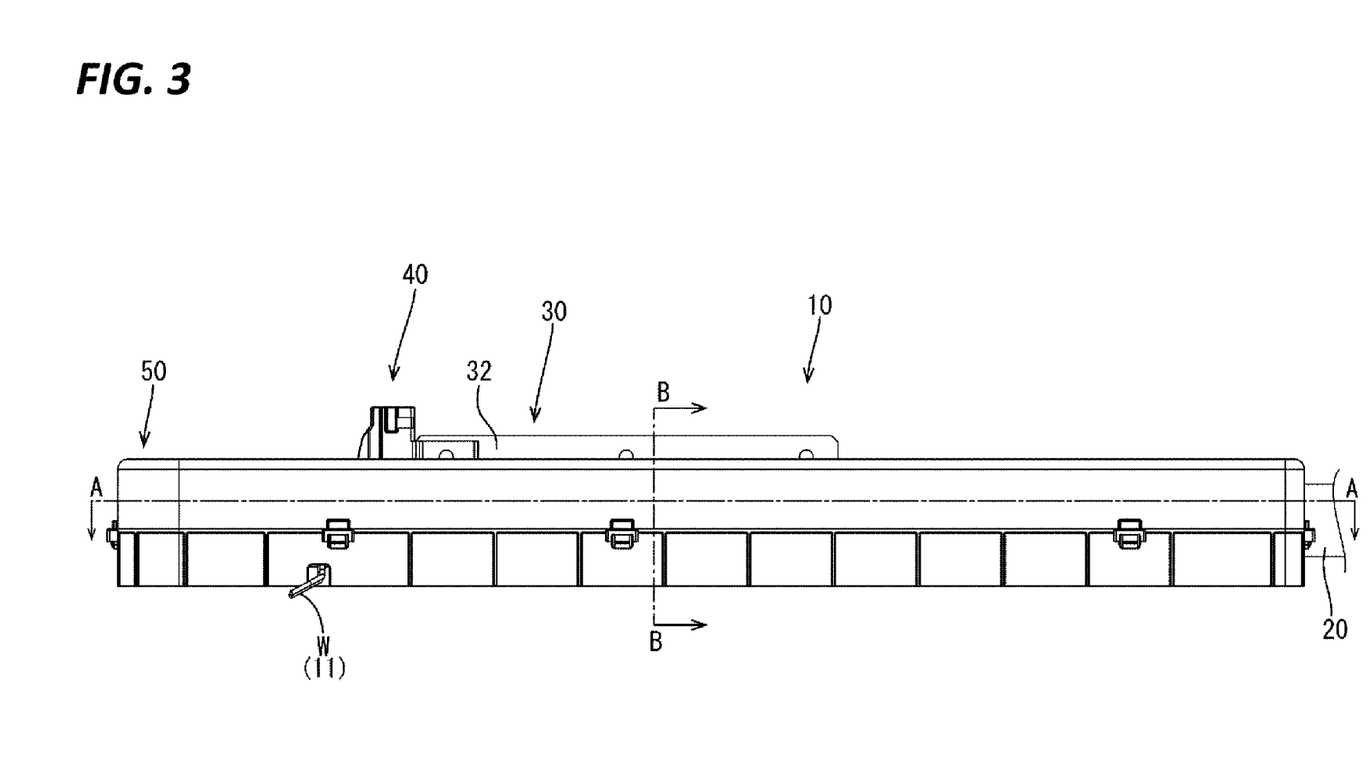
FIG. 3 is an enlarged side view of a main portion of the wire harness routing apparatus.
Figure 4:
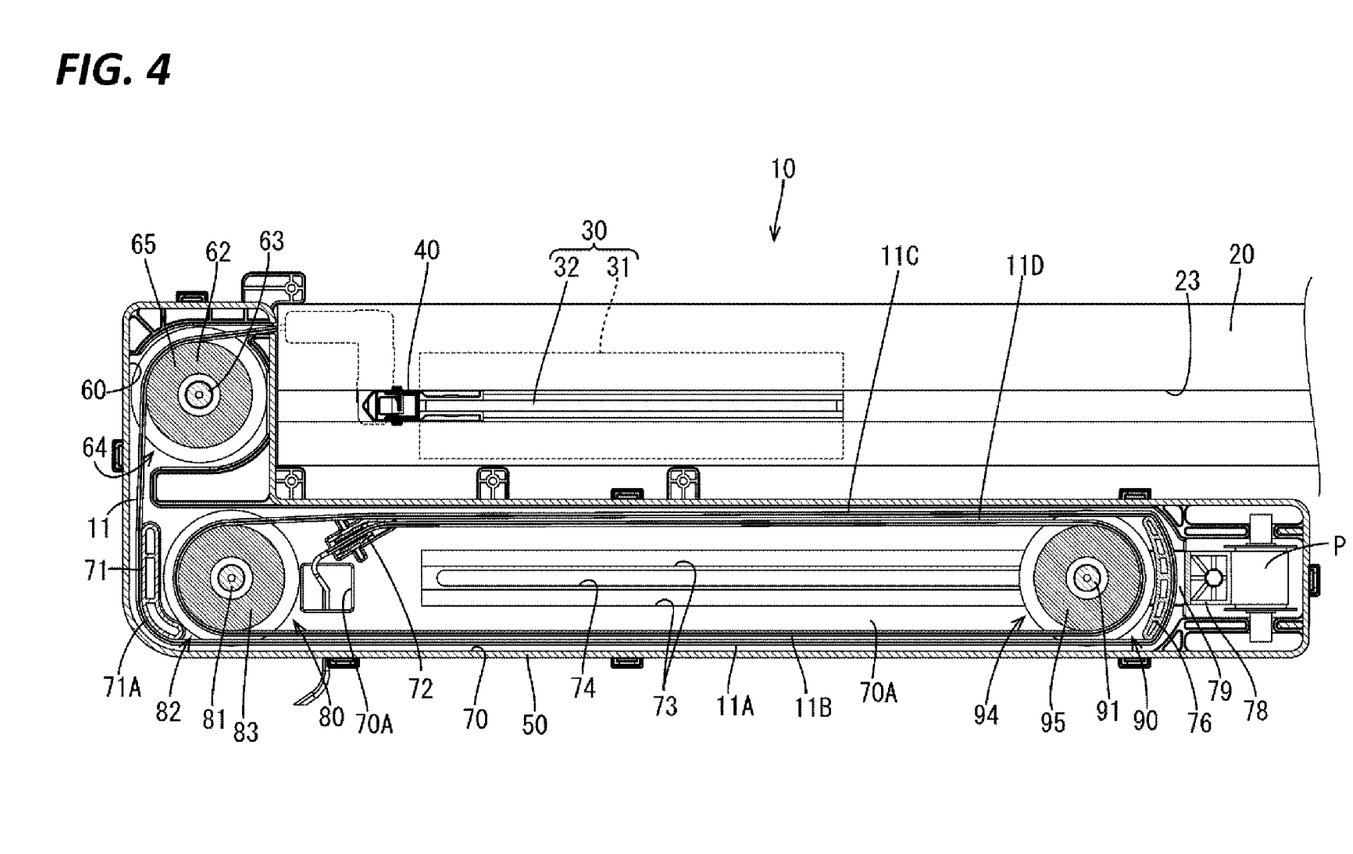
FIG. 4 is a cross-sectional view taken along the line A-A in FIG. 2.

The slider 30 is made of, for example, synthetic resin or metal, and can slide in the front-rear direction between a frontward position where the slider 30 is located at the front end portion of the rail 20 as shown in FIGS. 3 and 4, and a rearward position where the slider 30 is arranged at the rear end portion of the rail 20 as shown in FIGS. 1 and 2.

As shown in FIGS. 4 and 5, the slider 30 has a cuboid insertion portion 31 in the rail 20 and an attachment portion 32 that protrudes in a plate shape upward from the through groove 23 of the rail 20. The attachment portion 32 is formed over the entire length in the front-rear direction of the slider 30, and for example, as shown in FIG. 2, the attachment portion 32 is fixed to the seat S at the lower end portion by a bolt or the like. Accordingly, when the attachment portion 32 is fixed to the seat S, the seat S moves in the front-rear direction as the slider 30 slides in the rail in the front-rear direction.

Also, as shown in FIGS. 2 to 4, a guide protector 40 through which the wire harness 11 extending from the seat S is inserted is attached to the front end portion of the slider 30.

The wire harness 11 is routed between the floor of the vehicle body and the seat S. The end portion on the vehicle body side of the wire harness 11 is connected to a device such as an ECU (Electronic Control Unit), and power supply and reception and transmission of signals are performed between the device on the vehicle body side and the electrical components of the seat S via the wire harness 11.

Figure 6:
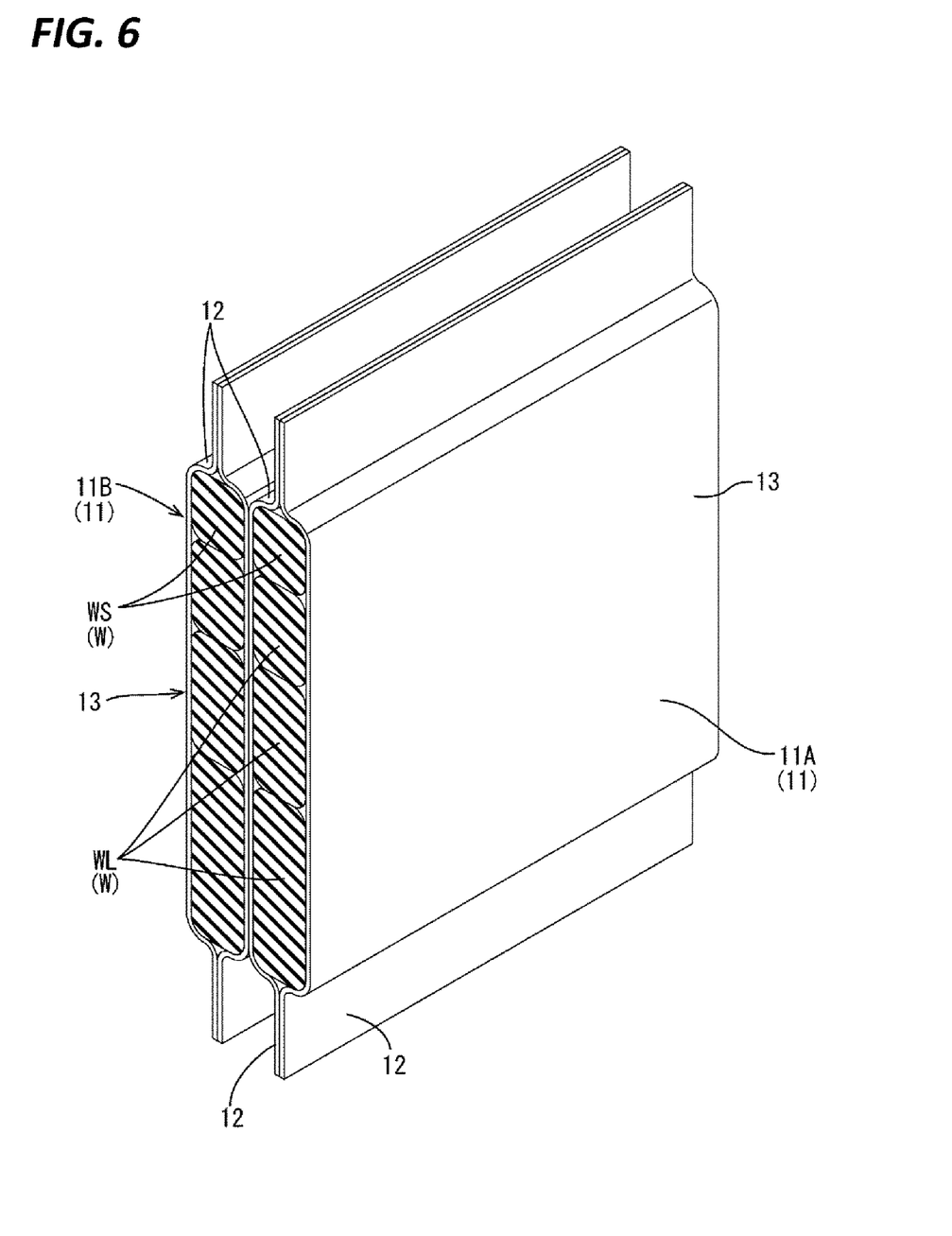
FIG. 6 is a perspective view showing a state in which an inner harness and an outer harness are arranged side by side.
Figure 7:
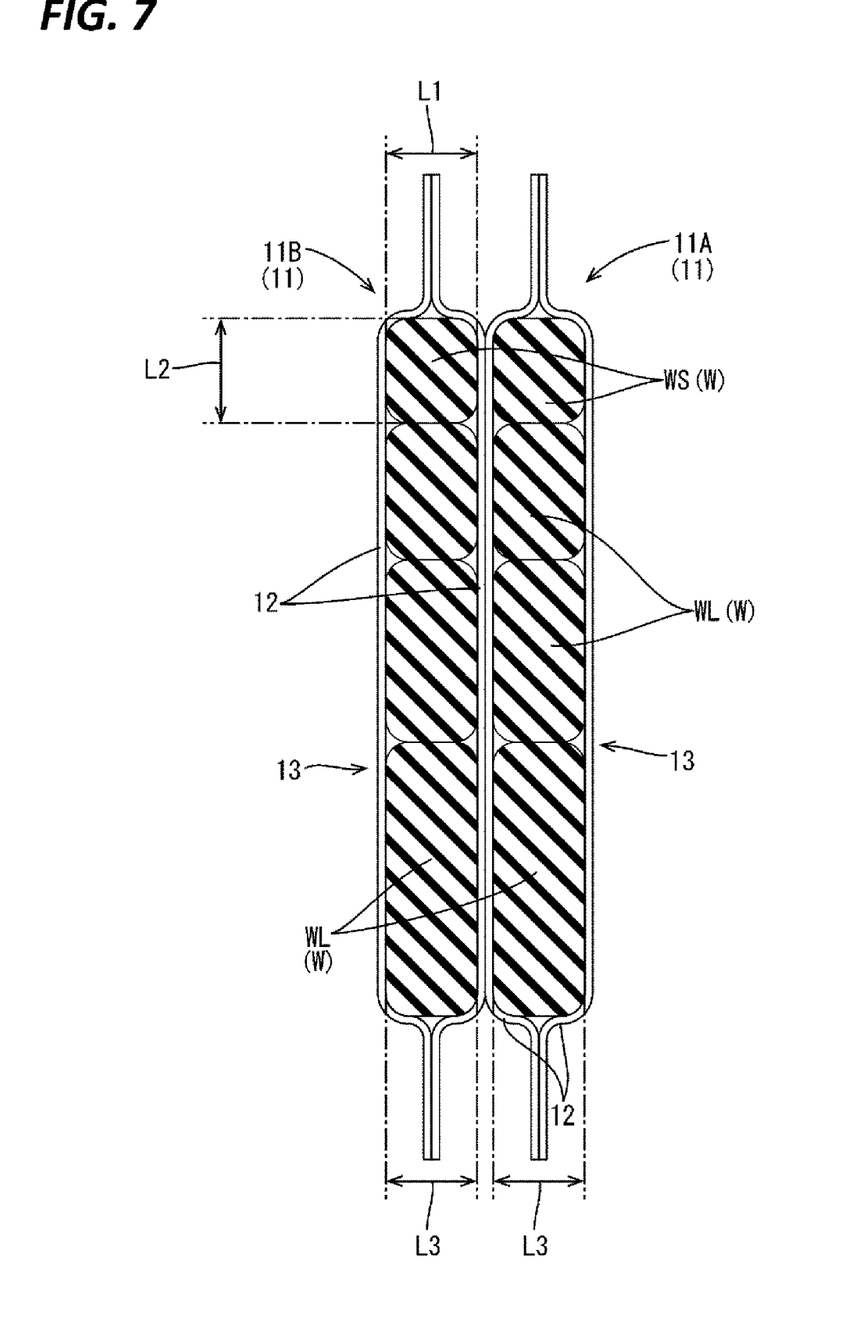
FIG. 7 is a cross-sectional view showing a state in which the inner harness and the outer harness are arranged side by side.

As shown in FIGS. 6 and 7, the wire harness 11 includes a plurality of covered electric wires W whose core wires are covered with insulating coverings, and a pair of base members 12 that sandwich and fix the plurality of covered electric wires W from both sides. The wire harness 11 in the present embodiment is configured such that four covered electric wires W are sandwiched between the pair of base members 12 from both sides.

Each covered electric wire W is connected to various types of electrical components provided on the seat S. Each covered electric wire W is routed in a state in which one end portion of a covered electric wire W pulled out from the guide protector 40 to the seat S side and the other end portion of the covered electric wire W pulled out from a laterdescribed harness accommodation portion 50 to the vehicle body side are not fixed to the base member 12.

The pair of base members 12 are made of a non-woven fabric having a sheet shape. Non-woven fabric is cloth formed by entwining or adhering fibers, such as fiber sheets, webs (thin film-like sheets composed only of fibers) or batts (blanket-like fibers). In this embodiment, the base member 12 is composed of a fiber sheet. Also, the base member 12 may be a woven fabric made by weaving natural fibers or synthetic fibers.

As shown in FIGS. 6 and 7, a plurality of covered electric wires W are fixed side by side to the base member 12 so as to extend along the base member at an approximate central portion in the vertical direction.

In the fixing of the covered electric wire W to the base member 12, fixing is performed using a known fixing method, such as joining the covered electric wire W to the base member 12 through ultrasonic welding or heat welding, fixing the covered electric wire W using a pressure-sensitive adhesive or an adhesive, or sewing the covered electric wire W to the base member 12. The plurality of covered electric wires W fixed to the base member 12 are arranged flat side by side so that no gap is formed between the adjacent covered electric wires W.

In the wire harness 11, the portion where the plurality of covered electric wires W are fixed to the base member 12 is the harness main body 13, and the harness main body 13 can curve in a direction orthogonal to the direction in which the plurality of covered electric wires W are arranged side by side (vertical direction).

The guide protector 40 is made of an insulating synthetic resin, and changes the orientation of the wire harness 11 toward the front while accommodating the wire harness 11 pulled out downward from the seat S in its interior. The guide protector 40 is fixed to the front end portion of the slider 30 using a known method such as a bolt or an adhesive.

As shown in FIG. 4, the guide protector 40 is arranged spanning between the inside and outside of the rail 20 through the through groove 23 of the rail 20, and an electric wire holding portion (not shown) for pulling out the wire harness 11 in the rail 20 while holding the wire harness 11 is provided at the front end portion of the guide protector 40. Accordingly, the wire harness 11 pulled out into the rail 20 is moved in and out from the front end opening of the rail 20 following the movement in the front-rear direction of the slider 30.

As shown in FIGS. 1 to 4, a harness accommodation portion 50 for accommodating an extra length portion of the wire harness 11 pulled out from the front end opening of the rail 20 is attached to the front end portion of the rail 20.

The extra length portion of the wire harness 11 is moved in and out of the harness accommodation portion 50 accompanying the movement of the slider 30. As shown in FIG. 4, the harness accommodation portion 50 includes a guide portion 60 that guides the extra length portion of the wire harness 11 pulled out from the rail 20 toward the left side, and an extra length accommodation portion 70 for accommodating the extra length portion of the wire harness 11 that has been guided from the guide portion 60.

The guide portion 60 is arranged on the front right side of the harness accommodation portion 50. The guide portion 60 includes a guide fixed pulley 62 that causes the wire harness 11 pulled out from the front end opening of the rail 20 to gently curve toward the left side in an L shape.

The guide fixed pulley 62 is constituted by including an approximately circular columnar support shaft 63 that is fixed to the bottom portion of the guide portion 60 and is elongated in the vertical direction, and a rotation portion 64 that is rotatably attached to the support shaft 63.

The rotation portion 64 has a cylindrical shaft portion 65 along which the wire harness 11 is arranged. Due to the shaft portion 65 rotating about the support shaft 63, the rotation portion 64 can smoothly move the wire harness 11 on the guide fixed pulley 62.

As shown in FIG. 4, the extra length accommodation portion 70 is formed elongated in the front-rear direction so as to extend along the left side portion of the rail 20. In the extra length accommodation portion 70, the extra length portion of the wire harness 11 pulled out from the rail 20 is accommodated in a state of being wound in an elliptical shape that is elongated in the front-rear direction.

The extra length accommodation portion 70 is constituted by including a guide portion 71 that causes the wire harness 11 introduced from the guide portion 60 to curve rearward, a direction regulating portion 76 that causes the wire harness 11 extending from the guide portion 71 to curve frontward, a front pulley 80 that causes the wire harness 11 extending from the direction regulating portion 76 to curve rearward, a rear pulley 90 that causes the wire harness 11 extending from the front pulley 80 to curve frontward, and a harness holding portion 72 for holding the wire harness 11 extending from the rear pulley 90.

The guide portion 71 is formed laterally elongated in the left-right direction at the front end portion of the extra length accommodation portion 70. The end portion of the left side of the guide portion 71 curves rearward. The guide portion 71 causes the wire harness 11 guided from the guide portion 60 to gently curve rearward due to the wire harness 11 being arranged along a front surface 71A of the guide portion 71.

The direction regulating portion 76 has a form that is elongated in the left-right direction, and is formed in one piece with a support arm 78 arranged in the extra length accommodation portion 70. As shown in FIG. 5, the support arm 78 has a pair of support plates 79 that are arranged on both sides in the vertical direction in the extra length accommodation portion 70. The direction regulating portion 76 is formed between the rear end portions of the pair of support plates 79.

As shown in FIG. 4, the direction regulating portion 76 has a form that gently curves rearward. The wire harness 11 is arranged in a state of being wrapped counterclockwise on the rear surface of the direction regulating portion 76. Accordingly, the extra length portion of the wire harness 11 slides with the rear surface of the direction regulating portion 76 and moves between the guide portion 71 and the front pulley 80 as it is taken in and out of the harness accommodation portion 50.

As shown in FIG. 4, the front pulley 80 has the same configuration as the guide fixed pulley 62 of the guide portion 60, and is constituted by including a circular columnar support shaft 81 that is elongated in the vertical direction and is fixed to the bottom portion 70D of the extra length accommodation portion 70 by a bolt (not shown) and a cylindrical rotation portion 82 that is rotatably attached to the support shaft 81.

The front pulley 80 smoothly moves the wire harness 11 between the direction regulating portion 76 and the rear pulley 90 due to the wire harness 11 being arranged along the front end portion of the shaft portion 83 of the rotation portion 82 and the shaft portion 83 rotating about the support shaft 81.

As shown in FIG. 4, the rear pulley 90 is configured to include a circular columnar support shaft 93 that is elongated in the vertical direction and is fixed by a bolt B between the pair of support plates 79 of the support arm 78, and a cylindrical rotation portion 94 that is rotatably attached to the support shaft 93.

The rear pulley 90 is arranged in front of the direction regulating portion 76 due to the support shaft 93 being fixed to the front end portions of the pair of support plates 79.

The rotation portion 94 has a cylindrical shaft portion 95 along which the wire harness 11 is arranged.

The rear pulley 90 smoothly moves the wire harness 11 between the front pulley 80 and the harness holding portion 72 due to the wire harness 11 being arranged along the rear end of the shaft portion 95 and the shaft portion 95 rotating about the support shaft 93.

Also, the diameter of the shaft portion 95 is set to be smaller than the length in the left-right direction of the direction regulating portion 76 so that the portion of the wire harness 11 extending in the front-rear direction from the direction regulating portion 76 does not come into contact with the portion of the wire harness 11 arranged on the rear pulley 90.

Accordingly, the wire harness 11 is routed in the extra length accommodation portion 70 in a state of being wrapped around the direction regulating portion 76, the front pulley 80, and the rear pulley 90 in the clockwise direction. When the wire harness 11 is routed in the extra length accommodation portion 70, the outer harness 11A, which is the portion of the wire harness 11 arranged between the guide portion 71 and the direction regulating portion 76, and the inner harness 11B, which is the portion of the wire harness 11 arranged between the front pulley 80 and the rear pulley 90, are arranged side by side in the left-right direction in a state of being in close proximity to each other in the left-right direction.

Also, the outer harness 11C, which is the portion of the wire harness 11 arranged between the direction regulating portion 76 and the front pulley 80, and the inner harness 11D, which is the portion of the wire harness 11 arranged between the rear pulley 90 and the harness holding portion 72, are arranged side by side in the left-right direction in a state of being in close proximity to each other in the left-right direction.

The harness holding portion 72 is arranged immediately after the front pulley 80. The harness holding portion 72 holds the end portion on the vehicle body side of the harness main body 13 of the wire harness 11 extending frontward from the rear pulley 90. The plurality of covered electric wires W pulled frontward from the harness main body 13 held by the harness holding portion 72 are pulled out from an approximately rectangular outlet 70A provided at the bottom portion 70D of the extra length accommodation portion 70 to the floor portion of the vehicle body.

The pair of support plates 79 of the support arm 78 can be fit in the pair of groove portions 73 respectively provided in the bottom portion 70D and the ceiling portion 70U of the extra length accommodation portion 70. Also, a head portion B1 of the bolt B for fixing the support plate 79 and the support shaft 93 can be fit in the through groove 74 provided so as to penetrate in the vertical direction between the pair of groove portions 73 in the bottom portion 70D and the ceiling portion 70U of the extra length accommodation portion 70.

Each groove portion 73, through groove 74, and support plate 79 is formed so as to extend in the front-rear direction. Due to the support plate 79 sliding in the front-rear direction in the groove 73 and the head B1 of the bolt B sliding in the front-rear direction in the through groove 74, the support arm 78 moves in the front-rear direction in the extra length accommodation portion 70 together with the direction regulating portion 76 and the rear pulley 90.

Also, a constant-load spring P is fixed to the rear end portion of the support arm 78. The constant-load spring P is obtained by wrapping an elongated plate spring, and the support arm 78 is biased rearward together with the direction regulating portion 76 and the rear pulley 90 due to the biasing force of the constant-load spring P.

Accordingly, if the extra length portion of the wire harness 11 is accommodated in the extra length accommodation portion 70, the direction regulating portion 76 and the rear pulley 90 move rearward so as to be separated from the front pulley 80 due to the biasing force of the constant-load spring P. On the other hand, if the extra length portion of the wire harness 11 is pulled out from the extra length accommodation portion 70, the pulling force acts against the biasing force of the constant-load spring P, whereby the direction regulating portion 76 and the rear pulley 90 move forward and approach the front pulley 80.

As a result, the length of the wire harness 11 between the direction regulating portion 76 and the rear pulley 90 and front pulley 80 changes, and the inner harnesses 11B and 11D and the outer harnesses 11A and 11C are kept in a state of always being in close proximity to each other in the left-right direction.

The transverse cross-sectional area in the left-right direction intersecting the axial direction of at least one covered electric wire W of the plurality of covered electric wires W in the wire harness 11 is different from the transverse cross-sectional areas of the other covered electric wires W. In the present embodiment, as shown in FIGS. 6 and 7, the transverse cross section of each covered electric wire W is formed in a square shape with four rounded corners. Among the plurality of covered electric wires W, the covered electric wire W located on the uppermost level is a minimum-diameter electric wire WS having the smallest transverse cross-sectional area, and the covered electric wires W below the minimum-diameter electric wire WS are non-minimum-diameter electric wires WL with greater transverse cross-sectional areas the farther downward they are located. Here, a "square shape" is a quadrangular shape including a square and a rectangle, and is also called a rectangular shape.

As shown in FIG. 7, in the minimum-diameter electric wire WS, a thickness (dimension in the left-right direction) L1 in the left-right direction, which is the thickness direction of the base member 12, of the covered electric wire W is substantially the same as a width (dimension in the vertical direction) L2 in the alignment direction of the covered electric wires W. Here, "substantially the same" includes a case where the thickness L1 and the width L2 are the same, and a case where the thickness L1 and the width L2 can be regarded as substantially the same even if they are different. Accordingly, the transverse cross section of the minimum-diameter electric wire WS is substantially rectangular.

As shown in FIG. 7, in the non-minimum-diameter electric wires WL located below the minimum-diameter electric wire WS, the thickness L3 of the covered electric wire W is set to be substantially the same as the thickness L1 of the minimum-diameter electric wire WS. Here, "substantially the same" includes a case where the thickness L3 of the covered electric wire W is the same as the thickness L1 of the minimum-diameter electric wire WS and a case where the thickness L3 of the covered electric wire W and the thickness L1 of the minimum-diameter electric wire WS can be regarded as being substantially the same even if they are different. Accordingly, the width of the non-minimum-diameter electric wire WL is greater than the thickness L1 of the minimum-diameter electric wire WS, and the transverse cross section of the non-minimum-diameter electric wire WL has a substantially rectangular shape that is elongated in the width direction (vertical direction).

In other words, in a plurality of covered electric wires W including the minimum-diameter electric wire WS, the thicknesses of the adjacent covered electric wires W are all substantially the same, and the thickness in the harness body 13 of the wire harness 11 is uniform over the entire width (the alignment direction of the electric wires W).

Also, if the inner harnesses 11B and 11D and the outer harnesses 11A and 11C are routed in close proximity to each other in the left-right direction in the extra length accommodation portion 70, for example, compared to a conventional wire harness in which a plurality of covered electric wires having various electric wire diameters are arranged flat side by side, the space in the thickness direction of the wire harness 11 can be reduced, and the space of the wire harness 11 can be saved.

The present embodiment has the above-described configuration, and subsequently, the operations and effects of the wire harness 11 and the wire harness routing apparatus 10 will be described.

For example, as shown in FIGS. 9 and 10, in a wire harness 2 in which a plurality of electric wires 1 are arranged flat side by side, if the electric wire diameters of the electric wires 1 vary, recesses and protrusions will appear on the surface 3 of the wire harness 2 and due to the variation in the thickness of the wire harness 2, dead space D will be generated in the thickness direction of the wire harness 2.

In view of this, the inventors of the present invention found the configuration of the present embodiment as a result of intensive study in order to solve the above-described problems. That is, the present embodiment includes a sheet-shaped base member 12 and a plurality of covered electric wires W fixed side by side along the base member 12, the transverse cross-sectional area in a direction intersecting the axial direction of at least one of the plurality of covered electric wires W is different from the transverse cross-sectional area of another covered electric wire W, and the thickness of the covered electric wire W in the thickness direction of the base member 12 is substantially the same as the thickness of an adjacent covered electric wire W.

According to such a wire harness 11, since the thicknesses of the plurality of covered electric wires W are all substantially the same, it is possible to prevent variation from appearing in the thickness of the wire harness 11. As a result, it is possible to prevent dead space from being generated in the thickness direction of the wire harness 11 and to save space in the wire harness 11.

Also, when the covered electric wire W having the smallest transverse cross-sectional area among the plurality of covered electric wires W is the minimum-diameter electric wire WS and the covered electric wire W having a larger transverse cross-sectional area than the minimum-diameter electric wire WS is the non-minimum-diameter electric wire WL, the width of the non-minimum-diameter electric wire WL in the arrangement direction of the plurality of covered electric wires W is larger than the thickness L1 of the minimum-diameter electric wire WS.

For example, if the thickness of a covered electric wire is substantially the same as the thickness of an adjacent covered electric wire and the width of the non-minimum-diameter electric wire is smaller than the thickness of the minimum-diameter electric wire, there will be no variation in the thickness direction of the wire harness, but the thickness of the wire harness will be greater than that in the width direction. Accordingly, there is concern that the wire harness cannot be routed in a limited region.

However, according to such a configuration, the width of the non-minimum-diameter electric wire WL becomes larger than the thickness L1 of the minimum-diameter electric wire WS, and therefore it is possible to prevent the thickness of the wire harness 11 from becoming larger than that in the width direction.

Also, in the minimum-diameter electric wire WS, the thickness L1 and the width L2 are substantially the same, and the thickness of the non-minimum-diameter electric wire WL is set to be substantially the same as the thickness L1 of the minimum-diameter electric wire WS.

That is, since the thickness L1 and the width L2 of the minimum-diameter electric wire WS are substantially the same, for example, it is possible to suppress a case in which the width of the wire harness 11 increases while suppressing a case in which the width of the wire harness 11 becomes unnecessarily large, compared to a case where the width of the minimum-diameter electric wire is greater than the thickness.

Also, since the transverse cross section of at least the non-minimum-diameter electric wire WL among the plurality of covered electric wires W is flat, for example, it is possible to eliminate dead space between the adjacent covered electric wires W and increase the installation area of the non-minimum-diameter electric wire WL with respect to the base member 12 compared to the case where the transverse cross section of the non-minimum-diameter electric wire is formed in an elliptical shape.

That is, since the area in which the covered electric wire W is fixed to the base member 12 through ultrasonic welding, heat welding, pressure-sensitive adhesive, or adhesive can be increased, it is possible to improve at least the adhesion strength of the non-minimum-diameter electric wire WL with respect to the base member 12 while saving space in the wire harness 11.

Also, in the present embodiment, the wire harness 11 and the harness accommodation portion 50 in which the inner harnesses 11B and 11D arranged on the inner side and the outer harnesses 11A and 11C arranged on the outer side are accommodated in close proximity to each other by arranging the wire harness 11 in a wrapped state are included, and therefore, for example, space in the thickness direction of the wire harness 11 in the region at which the inner harnesses 11B and 11D and the outer harnesses 11A and 11C are in close proximity to each other can be reduced compared to a wire harness routing apparatus to which a conventional wire harness in which a plurality of covered electric wires having various electric wire diameters are arranged flat side by side is applied. As a result, it is possible to suppress a case in which the harness accommodation portion 50 increases in size in the left-right direction, and it is possible to suppress a case in which the wire harness routing apparatus 10 increases in size.

Second Embodiment

Figure 8:
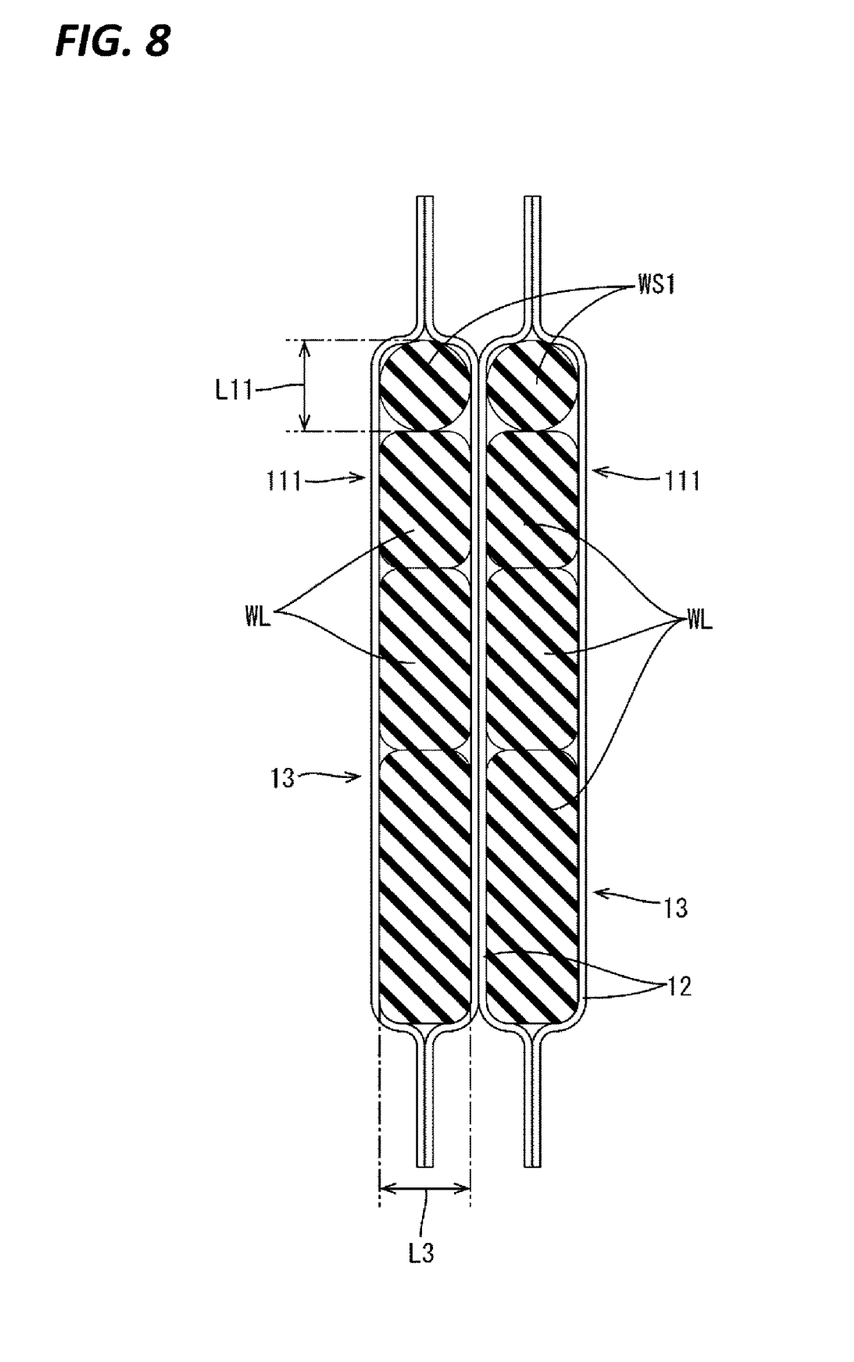
FIG. 8 is a cross-sectional view corresponding to the cross section of FIG. 7 in a second embodiment.

Next, a second embodiment will be described with reference to FIG. 8.

The wire harness 111 of the second embodiment is obtained by modifying the shape of the minimum-diameter electric wire WS of the wire harness 11 of the first embodiment, and has the same configuration, operations, and effects as the first embodiment, and therefore description thereof is omitted. Also, the same reference numerals are used for the same configurations as in the first embodiment.

In the wire harness 111 of the second embodiment, the shape of the transverse cross section of the minimum-diameter electric wire WS1 is formed in a circular shape. The dimension L11 of the diameter of the minimum-diameter electric wire WS1 and the thickness L3 of the non-minimum-diameter electric wire WL are substantially the same. In other words, the thickness and width of the minimum-diameter electric wire WS1 and the thickness L3 of the non-minimum-diameter electric wire WL are substantially the same.

That is, in the wire harness 111 of the present embodiment, the conventional covered electric wire is applied as the minimum-diameter electric wire WS, and it is not necessary to newly manufacture the minimum-diameter electric wire WS, and therefore the manufacturing cost of the wire harness 111 can be reduced.

Other Embodiments

The techniques disclosed in the present specification are not limited to the embodiments described through the above description and the drawings, and for example, the following various aspects are also encompassed therein.

(1) In the above-described embodiment, a configuration was used in which the transverse cross-sectional areas of the covered electric wires W in the wire harness 11 were greater the further downward they were located. However, the arrangement is not limited to this, and the arrangement of the covered electric wires in the wire harness may be selected as appropriate.

(2) In the above-described embodiment, a configuration was used in which the thickness of the non-minimum-diameter electric wire WL is substantially the same as the thickness L1 of the minimum-diameter electric wire WS. However, the present invention is not limited to this, and it is also possible to use a configuration in which the thickness of the minimum-diameter electric wire is set to be substantially the same as the thickness of any non-minimum-diameter electric wire.

(3) In the above-described embodiment, the wire harness routing apparatus 10 to which the wire harness 11 is applied was shown as an example. However, the present invention is not limited to this, and the technique of the present specification may also be applied to a wire harness to be routed in a roof, floor, or door panel of a vehicle.

The embodiments disclosed herein should be considered to be exemplary in all respects and not restrictive. The scope of the present invention is indicated not by the above-described meaning but by the scope of the claims, and all modifications within the meaning and range of equivalency to the claims are intended to be encompassed therein.

LIST OF REFERENCE NUMERALS

10 Wire harness routing apparatus
11 Wire harness
11A, 11C Outer harness
11B, 11D Inner harness
12 Base member
50 Harness accommodation portion
70 Extra length accommodation portion (one example of "harness accommodation portion")
W Covered electric wire (one example of "electric wire")
WL Non-minimum-diameter electric wire
WS Minimum-diameter electric wire

What is claimed is:

1. A wire harness comprising:
a sheet-shaped base member made of a non-woven fabric; and
a plurality of electric wires fixed side by side in a vertical direction along the base member, the plurality of electric wires each including a core wire and an insulating covering that covers the core wire,
wherein a transverse cross-sectional area, which is a cross-sectional area in a direction intersecting an axial direction of one of the plurality of electric wires, is different from a transverse cross-sectional area of remaining electric wires,
a thickness of the one of the electric wires in a thickness direction of the base member is substantially the same as a thickness of the remaining electric wires,
the one of the electric wires is a minimum-diameter electric wire with the smallest transverse cross-sectional area among the plurality of electric wires, and
the minimum-diameter electric wire is arranged on the uppermost level among the plurality of electric wires.

2. The wire harness according to claim 1,
wherein each of the remaining electric wires is a non-minimum-diameter electric wire with a greater transverse cross-sectional area than the minimum-diameter electric wire,
the width of the non-minimum-diameter electric wire in the arrangement direction of the plurality of electric wires is greater than the thickness of the minimum-diameter electric wire.

3. The wire harness according to claim 2,
wherein the thickness and the width of the minimum-diameter electric wire are substantially the same as each other, and
the thickness of the non-minimum-diameter electric wire is set to be substantially the same as the thickness of the minimum-diameter electric wire.

4. The wire harness according to claim 2,
wherein a transverse cross section of at least the non-minimum-diameter electric wire among the plurality of electric wires is rectangular.

5. The wire harness according to claim 1,
wherein a transverse cross-section of the minimum-diameter electric wire is circular.

6. A wire harness routing apparatus comprising:
the wire harness according to claim 1; and
a harness accommodation portion configured to accommodate the wire harness arranged in a wrapped state.

7. The wire harness according to claim 1, wherein the plurality of electric wires are continuously arranged in the vertical direction.

* * * * *